US011778190B2

United States Patent
Le Leannec et al.

(10) Patent No.: US 11,778,190 B2
(45) Date of Patent: Oct. 3, 2023

(54) METHOD AND DEVICE FOR INTRA-PREDICTIVE ENCODING/DECODING A CODING UNIT COMPRISING PICTURE DATA, SAID INTRA-PREDICTIVE ENCODING DEPENDING ON A PREDICTION TREE AND A TRANSFORM TREE

(71) Applicant: InterDigital VC Holdings, Inc., Wilmington, DE (US)

(72) Inventors: Fabrice Le Leannec, Mouazé (FR); Tangi Poirier, Rennes (FR); Gagan Rath, Rennes (FR); Fabrice Urban, Thorigne Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 501 days.

(21) Appl. No.: 16/077,471

(22) PCT Filed: Feb. 3, 2017

(86) PCT No.: PCT/EP2017/052322
§ 371 (c)(1),
(2) Date: Aug. 11, 2018

(87) PCT Pub. No.: WO2017/137312
PCT Pub. Date: Aug. 17, 2017

(65) Prior Publication Data
US 2019/0052881 A1 Feb. 14, 2019

(30) Foreign Application Priority Data
Feb. 12, 2016 (EP) .................................... 16305160

(51) Int. Cl.
*H04N 19/129* (2014.01)
*H04N 19/119* (2014.01)
(Continued)

(52) U.S. Cl.
CPC ......... *H04N 19/129* (2014.11); *H04N 19/119* (2014.11); *H04N 19/159* (2014.11); *H04N 19/176* (2014.11); *H04N 19/593* (2014.11)

(58) Field of Classification Search
CPC .. H04N 19/129; H04N 19/119; H04N 19/159; H04N 19/176; H04N 19/593;
(Continued)

(56) References Cited

U.S. PATENT DOCUMENTS

| 8,964,833 B2 | 2/2015 | Auwera et al. |
| 9,106,930 B2 | 8/2015 | Hendry et al. |

(Continued)

FOREIGN PATENT DOCUMENTS

| EP | 2908525 | 8/2015 |
| JP | 2013502145 | 1/2013 |

(Continued)

OTHER PUBLICATIONS

Chen et al., "Screen Content Coding Using Non-Square Intra Block Copy for HEVC", 2014 IEEE International Conference on Multimedia and Expo (ICME), Chengdu, China, Jul. 14, 2014, pp. 1-6.

(Continued)

*Primary Examiner* — Jianxun Yang
(74) *Attorney, Agent, or Firm* — Klintworth & Rozenblat IP LLP (57) ABSTRACT

The present principles relates to a method for intra-predictive encoding a coding unit comprising picture data, said intra-predictive encoding depending on a prediction tree and a transform tree, characterized in that the method further comprises: —obtaining said prediction tree by spatially partitioning the coding unit according to a non-square partition type; —determining said transform tree from said coding unit in order that each of its leaves is embedded into a unique unit of said obtained prediction tree; and —signal- (Continued)

ing in a signal the size of the leaves of said transform tree and said a non-square partition type.

20 Claims, 9 Drawing Sheets

(51) Int. Cl.
*H04N 19/593* (2014.01)
*H04N 19/159* (2014.01)
*H04N 19/176* (2014.01)

(58) Field of Classification Search
CPC .... H04N 19/134; H04N 19/86; H04N 19/157; H04N 19/82; H04N 19/117
See application file for complete search history.

(56) References Cited

U.S. PATENT DOCUMENTS

| | | | |
|---|---|---|---|
| 2011/0134998 | A1 | 6/2011 | Lee |
| 2013/0016366 | A1 | 1/2013 | Sawada et al. |
| 2013/0022107 | A1* | 1/2013 | Van der Auwera .. H04N 19/159 375/240.03 |
| 2013/0094580 | A1 | 4/2013 | Zhou |
| 2013/0136175 | A1 | 5/2013 | Wang |
| 2014/0140404 | A1 | 5/2014 | Liu |
| 2014/0226719 | A1 | 8/2014 | Yamamoto |
| 2015/0208084 | A1 | 7/2015 | Zhu et al. |
| 2016/0219290 | A1* | 7/2016 | Zhao ................... H04N 19/109 |
| 2018/0035123 | A1* | 2/2018 | Wennersten ......... H04N 19/503 |

FOREIGN PATENT DOCUMENTS

| | | |
|---|---|---|
| JP | 2013513330 | 4/2013 |
| JP | 2014532384 | 12/2014 |
| JP | 2015515236 A | 5/2015 |
| RU | 2562764 C2 | 9/2015 |
| WO | 2011019253 A2 | 2/2011 |
| WO | 2011019253 A3 | 6/2011 |
| WO | 2011019253 A4 | 8/2011 |
| WO | 2012122275 A1 | 9/2012 |
| WO | WO2013039908 | 3/2013 |
| WO | 2013047805 A1 | 4/2013 |
| WO | WO2013082291 | 6/2013 |

OTHER PUBLICATIONS

Anonymous, "Reference software for ITU-T H.265 high efficiency video coding", International Telecommunication Union Standard, ITU-T H.265.2, Series H: Audiovisual and Multimedia Systems, infrastructure of audiovisual services—Coding of moving video, Oct. 2014, pp. 1-12.

Anonymous, "Algorithm Description of Joint Exploration Test Model 1 (JEM 1)", International Organisation for Standardisation,ISO/IEC JTC 1/SC 29/WG 11, Coding of Moving Pictures and Audio, Document N15790, Geneva, Switzerland, Oct. 2015, pp. 1-27.

Kawamura et al., "Asymmetric Partitioning with Non-power-of-two ransform for Intra Coding", 2012 Picture Coding Symposium (PCS), Krakow, Poland, May 7, 2012, pp. 429-432.

Liu et al., "Rectangular (2NxN and Nx2N) Intra Prediction", Joint Collaborative Team on Video Coding (JCT-VC) of ITU-T SG16 WP3 and ISO/IEC JTC1/SC29/WG11, Document JCTVC-G135, Working Group 11 No. 21687, 7th Meeting, Geneva, Switzerland, Nov. 21, 2011, pp. 1-6.

Kim et al., "Block Partitioning Structure in the HEVC Standard", IEEE Transactions on Circuits and Systems for Video Technology, vol. 22, No. 12, Dec. 2012, pp. 1697-1706.

Nguyen et al., "Transform Coding Techniques in HEVC", IEEE Journal of Selected Topics in Signal Processing, vol. 7, No. 6, Dec. 2013, pp. 978-989.

International Search Report and Written Opinion of the International Searching Authority for PCT/EP2017/052322 dated Apr. 21, 2017, 14 pages.

International Preliminary Report on Patentability for PCT/EP2017/052322 dated Aug. 14, 2018, 10 pages.

* cited by examiner

METHOD AND DEVICE FOR INTRA-PREDICTIVE ENCODING/DECODING A CODING UNIT COMPRISING PICTURE DATA, SAID INTRA-PREDICTIVE ENCODING DEPENDING ON A PREDICTION TREE AND A TRANSFORM TREE

This application claims the benefit, under 35 U.S.C. § 365 of International Application PCT/EP2017/052322, filed Feb. 3, 2017, which was published in accordance with PCT Article 21(2) on Aug. 17, 2017, in English, and which claims the benefit of European Patent Application No. 16305160.0, filed Feb. 12, 2016.

1. FIELD

The present principles generally relate to picture/video intra-encoding and intra-decoding.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, a picture contains one or several arrays of samples (pixel data) in a specific picture/video format which specifies all information relative to the pixel values of a picture (or a video) and all information which may be used by a display and/or any other device to visualize and/or decode a picture (or video) for example. A picture comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel data may be represented by a vector of C values, where C is the number of components. Each value of a vector is represented with a number of bits which defines a maximal dynamic range of the pixel values.

A picture block means a set of pixels which belong to this picture and the pixel data of a picture block means the values of the pixels which belong to this picture block.

In some video compression standards like H.265/HEVC (High Efficiency Video Coding (HEVC), Recommendation ITU-T H.265| International Standard ISO/IEC 23008-2, 10/2014) or JEM ("Algorithm Description of Joint Exploration Test Model 1 (JEM 1)", ISO/IEC JTC1/SC29/WG11/N15790, October 2015, Geneva, CH), the picture of a sequence of picture (video) is divided into so-called Coding Tree Units (CTU), which size is typically 64×64, 128×128, or 256×256 pixels.

Figure 1:
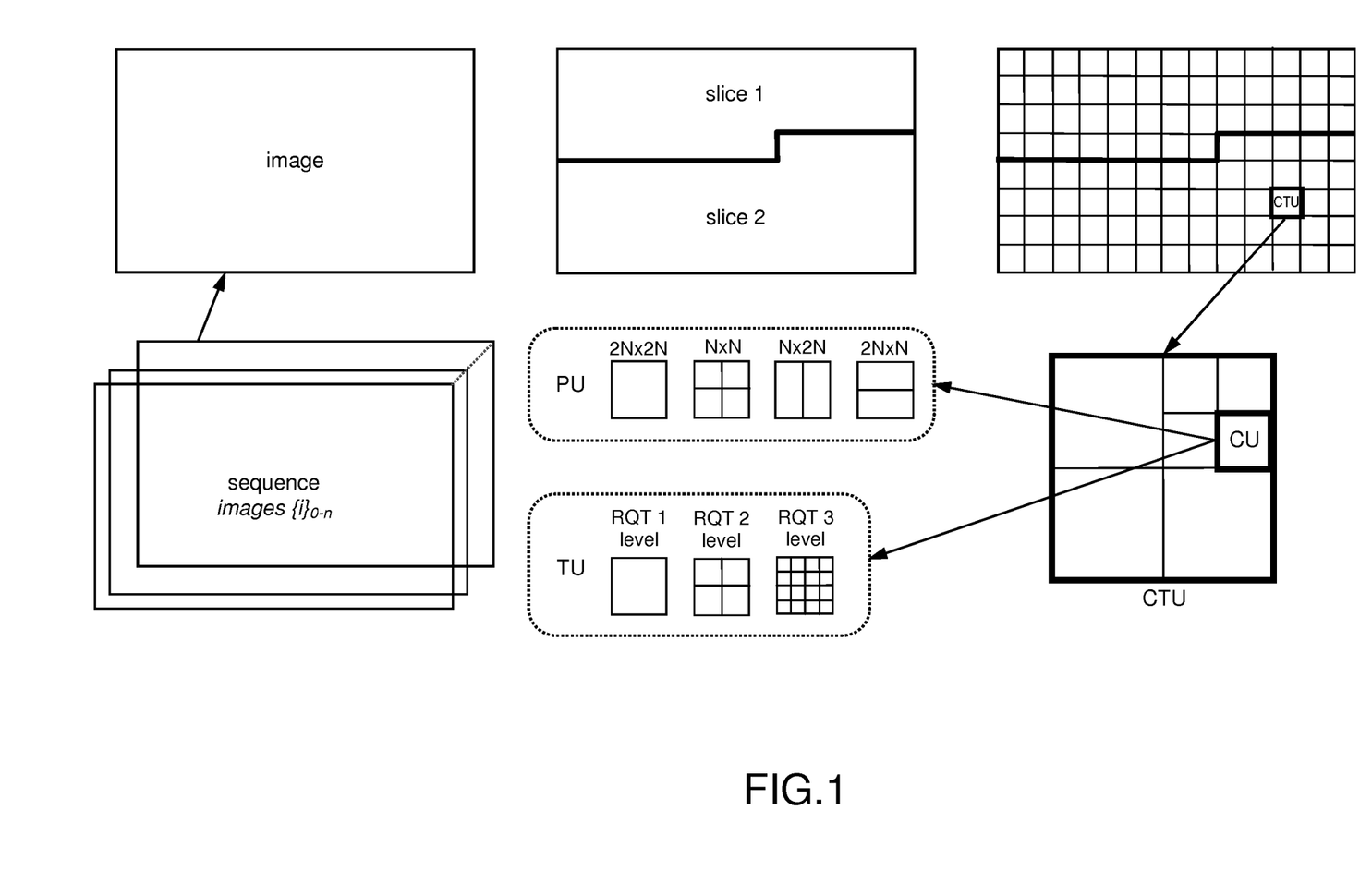
FIG. 1 illustrates the partitioning of picture data in a coding context according to HEVC.

Each CTU is represented by a Coding Tree in the compressed domain as shown in FIG. 1. This is a quad-tree division of the CTU, where each leaf is called a Coding Unit (CU).

A Coding Unit (CU) contains the main information for coding a picture block and may be further partitioned into Prediction Units (PU) and Transform Units (TU).

Each CU is then given some Intra or Inter prediction parameters (Prediction Info). To do so, each CU is spatially partitioned into one or more Prediction Units (PUs) according to a specific partition type and each PU being assigned some prediction information. The Intra or Inter coding mode is assigned on the CU level.

The Prediction Unit (PU) thus contains the information for predicting the pixel values inside a picture block and the Transform Unit (TU) represents the pixels of a picture block on which the transform is applied and thus the remaining of the encoding process.

Figure 2:
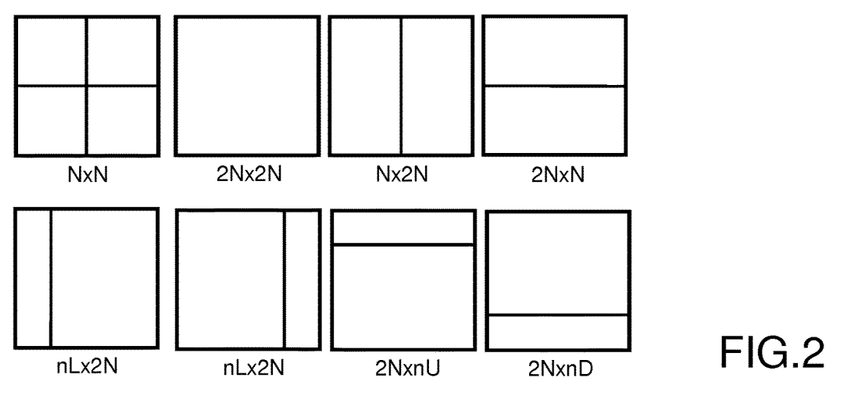
FIG. 2 shows examples of partitioning of a CU into prediction units according to HEVC.

FIG. 2 shows examples of partitioning of a CU into prediction units according to HEVC.

The partition types include square partition types (2N×2N and N×N), which are the only ones used for both Intra and Inter-predicting CUs, symmetric non-square partition types (2N×N, N×2N) which are used only for Inter-predicting CUs, and asymmetric Partitions (nL×2N, nR×2N, 2N×nD; 2N×nU) which are used only for Inter-predicting CUs.

HEVC discloses that motion information partitioning can be performed for Inter-predicting CUs. Indeed, the 2N×N, N×2N and asymmetric partitions that exist for Inter-predicting CUs are examples of non-square partition types to represent the prediction information contained in a CU.

Moreover, HEVC imposes constraints on the selection of a partition type for intra or inter-predicting CUs:
If the partition type for intra-predicting the luma component of a CU is not a square partition type, then the partition type for intra-predicting the Chroma component is set equal to the square partition type 2N×2N.
When a non-square partition type is used for inter-predicting a CU, the transform tree used to further divides the CU into Transform Units (TUs) is constrained such that each TU is spatially embedded in a prediction unit.

Moreover, according to the current version of HEVC, when a non-square partitioning type is used for a given CU, the size of units of the transform tree is decided independently from the prediction tree.

The problem addressed by the present principles is how to efficiently represent a coded picture in the compressed domain, in a way that improves compression efficiency in Intra Coding Units.

3. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method for intra-predictive encoding a coding unit comprising picture data, said intra-predictive encoding depending on a prediction tree and a transform tree. The method further comprises:
obtaining said prediction tree by spatially partitioning the coding unit according to a non-square partition type;
determining said transform tree from said coding unit in order that each of its leaves is embedded into a unique unit of said obtained prediction tree; and
signaling in a signal the size of the leaves of said transform tree and said a non-square partition type.

Said a non-square partition type can be a non-square partition type. Thus, new non-square partition types are added to the 2N×2N and N×N existing types in Intra as currently recommended by HEVC.

These include the types 2N×nU, 2N×nD, nL×2N, nR×2N, which already exist for Inter-predicting. In addition, other PU shapes are can be added to this set.

The basic idea behind these present principles is that a richer set of possible PUs shapes helps in representing the picture data more accurately in the compressed domain.

As described below in details, the present principles include technical means that make it possible to support Intra Partitions different from 2N×2N and N×N in the codec design.

In particular, the present principles support any intra-prediction unit shape, given that a PU exactly embeds on or several TU. A TU cannot spatially overlap several different PUs.

Specific ways to process the Transform Tree according to the shape of the Prediction Unit are proposed below, to make it adapted to Intra-encoding of CUs.

Furthermore, the present principles also proposes to dissociate the partitioning of CUs in Luma and Chroma components, when non-square partitioning for PUs are used for the Luma component.

According to other of their aspects, the present principles relate to a device comprising a processor configured to implement the above method, a computer program product comprising program code instructions to execute the steps of the above method when this program is executed on a computer, a processor readable medium having stored therein instructions for causing a processor to perform at least the steps of the above method, and a non-transitory storage medium carrying instructions of program code for executing steps of the above method when said program is executed on a computing device.

The specific nature of the present principles as well as other objects, advantages, features and uses of the present principles will become evident from the following description of examples taken in conjunction with the accompanying drawings.

4. BRIEF DESCRIPTION OF DRAWINGS

In the drawings, examples of the present principles are illustrated. It shows.

Similar or same elements are referenced with the same reference numbers.

6. DESCRIPTION OF EXAMPLE OF THE PRESENT PRINCIPLES

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for encoding/decoding a picture but extends to the encoding/decoding of a sequence of pictures (video) because each picture of the sequence is sequentially encoded/decoded as described below.

Figure 3A:
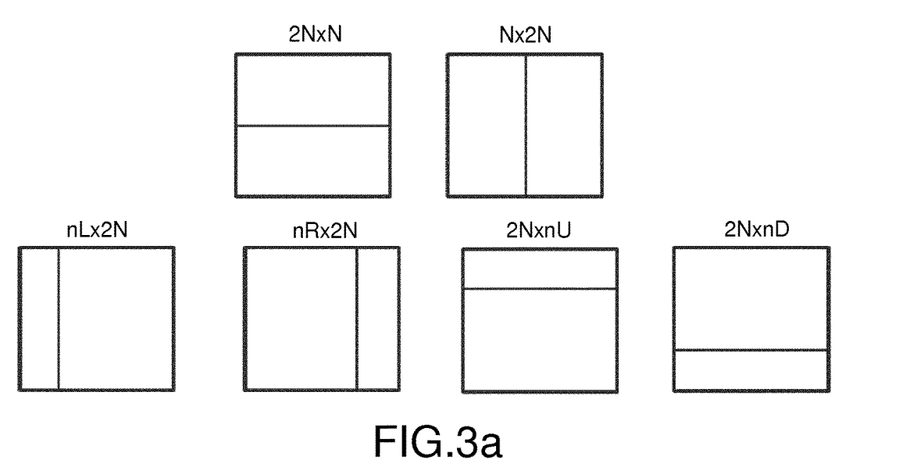
FIGS. 3*a-b* shows examples of non-square partition types used for intra-predicting a CU.
Figure 3B:
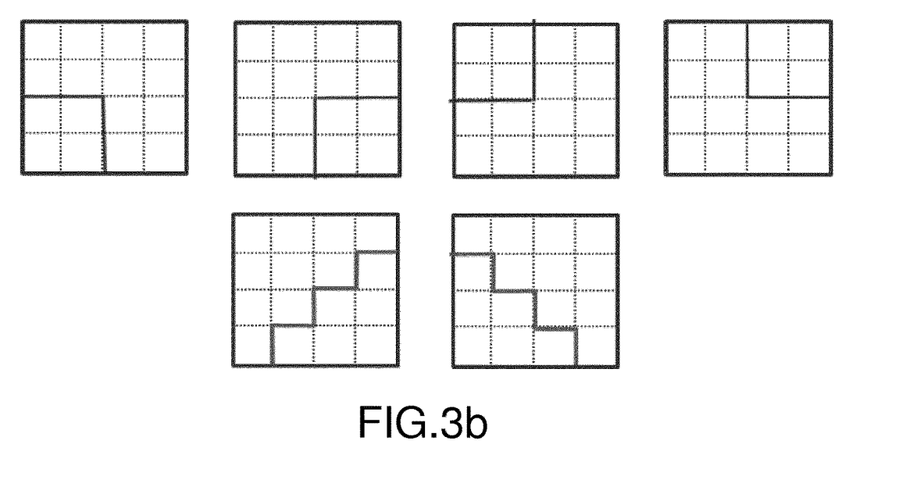

The present principles consist in an enriched set of Intra Partition Types for Intra-predicting Coding Units. First, all partition types different from 2N×2N and N×N, which already exist in for Inter-predicting CUs as defined in HEVC, are added to the existing codecs design as shown in FIG. 3a.

Additionally, the present principles make it possible to support new non-square partition types. Indeed, if the Transform Tree is left fully independent from the partitioning into prediction units (PUs), as was done so far in HEVC and in the JEM, then it is not possible to support these new Intra partitions. Below is describes the technical means that make it possible to support these new Intra Partitions in Intra.

The present principles relate to a method for intra-predictive encoding a coding unit CU comprising picture data, said intra-predictive encoding depending on a prediction tree and a transform tree. The method further comprises:
- obtaining said prediction tree by spatially partitioning the coding unit according to a non-square partition type;
- determining said transform tree in order that each of its leaves is embedded into a unique unit of said obtained prediction tree; and
- signaling in a signal the size of the leaves of said transform tree and said a non-square partition type.

According to an embodiment, the method further comprises determining a transform tree scanning order according to said a non-square partition type, such that the leaves of the transform tree which are embedded in a same unit of said obtained prediction tree are all scanned before starting to scan leaves of the transform tree which are embedded in another unit of said obtained prediction tree.

According to an embodiment, the transform tree scanning order is a Z-scan order.

According to an embodiment, the leaves of a same transform tree have a same size.

Here details of such embodiments of the method.

The first technical mean to support a non-square partition type for intra-predicting CUs aims at ensuring that any TU contained in an intra-predicted CU is spatially embedded within its co-located PU. This is mandatory in Intra (and not in Inter-predicting), to make it possible to perform Intra Prediction based on surrounding reference samples that are available in their fully reconstructed version.

To do so, the present principles impose to partition a CU in the following way if a non-square partition type for intra-predicting is considered:
The CU is divided into one Transform Tree, which is made of leaves with maximum size, given that these leaves are embedded in the CU's prediction units. This division into Transform Tree leaves is performed in a synchronous way on the encoder and on the decoder sides, and is fully inferred as a function of the CU (Coding Unit) and PUs (units of the prediction tree) sizes and shapes.

The advantage of this characteristics is that it ensures Intra prediction can be done TU (Unit of the Transform tree) by TU in a closed loop way, even when non-square PUs are chosen for current Intra CU.

The Transform Tree leaves are processed (encoder and decoder sides) according to a Transform Tree scanning order, which depends on the PUs' types. This scanning order is known by the decoder. It is designed so as to ensure that all transform tree leaves spatially located in a given Prediction Unit are processed before starting to process the Transform tree leaves spatially located in another PU. The PU indexing order is respected during the processing (decoding or coding) of transform tree leaves.

The advantage of this characteristic is that it makes the Rate Distortion optimization of Intra prediction modes manageable on the encoder side, when non-square intra PUs are used. Indeed, it allows choosing the Intra Prediction Mode associated to a given Prediction Unit, before starting to process the next PU. This would not be the case if the existing Z-San scanning order was employed. Note that with the initial 2N×2N and N×N, the HEVC Z-Scan order to process the transform tree of a given CU naturally follows the same order as the PU indexing order.

Figure 4:
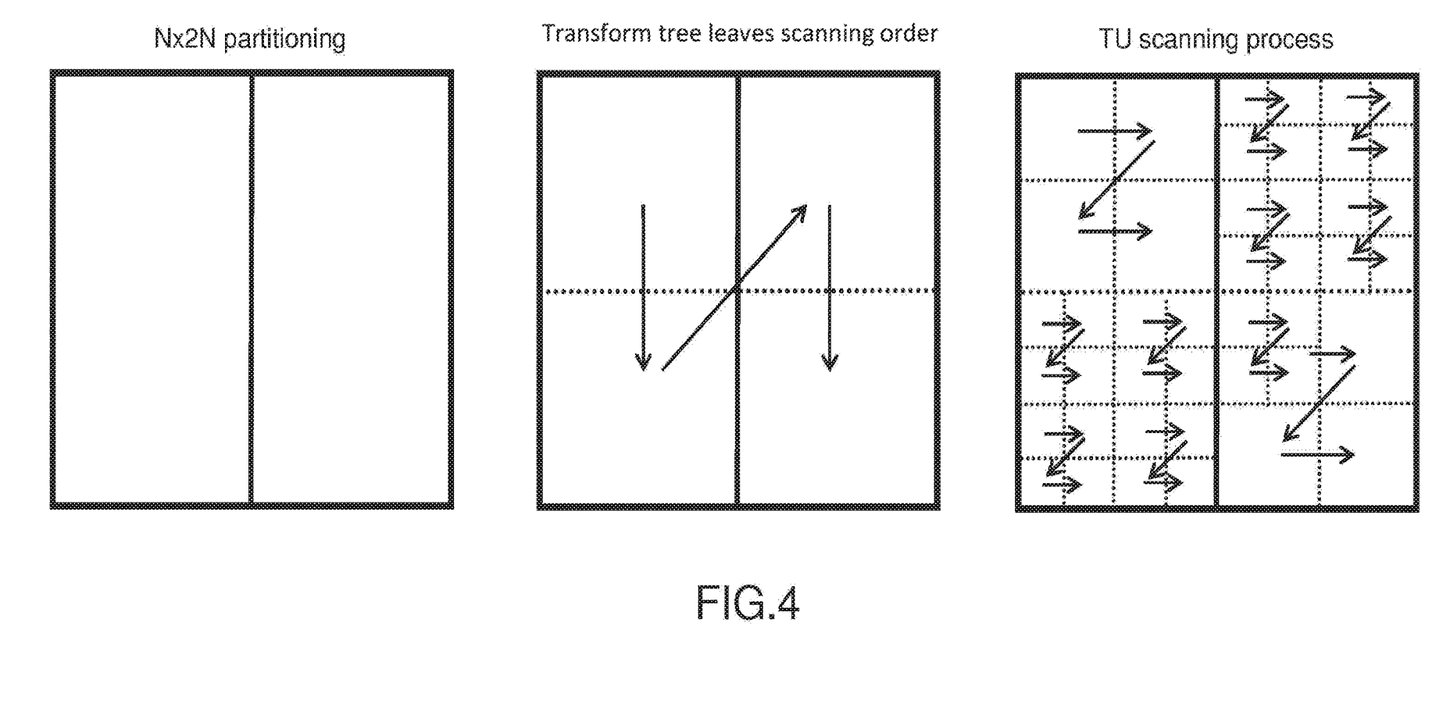
FIGS. 4-9 shows examples for scanning the transform tree leaves related to a CU.

FIG. 4 shows examples for scanning the transform tree leaves related to a CU; left: prior art, Right embedded quad-tree.

According to a first embodiment (embodiment TU-1), the Transform Units contained in each Transform Tree leaf are processed (decoding and coding) in a quad-tree fashion. This means each transform tree leaf is split into smaller TUs following a quad-tree. This quad-tree further extends the Transform Tree beyond the transform tree leaves introduced above, which are split in a quad-tree fashion. This is illustrated on the right of FIG. 4. The TU sizes are decided by the Rate Distortion Optimization process on the encoder side, and are signaled in a signal through the existing transform tree coding syntax. The TU scanning order employed during the decoding or coding of each transform tree may be a Z-scan order (see Right side of FIG. 4), as is the case in HEVC or in the JEM.

The advantage of this characteristic is that it allows finding a rate distortion optimal set of transform units associated to a given CU and PU type. In particular, Transform Units as large as possible can be used wherever possible.

Figure 5:
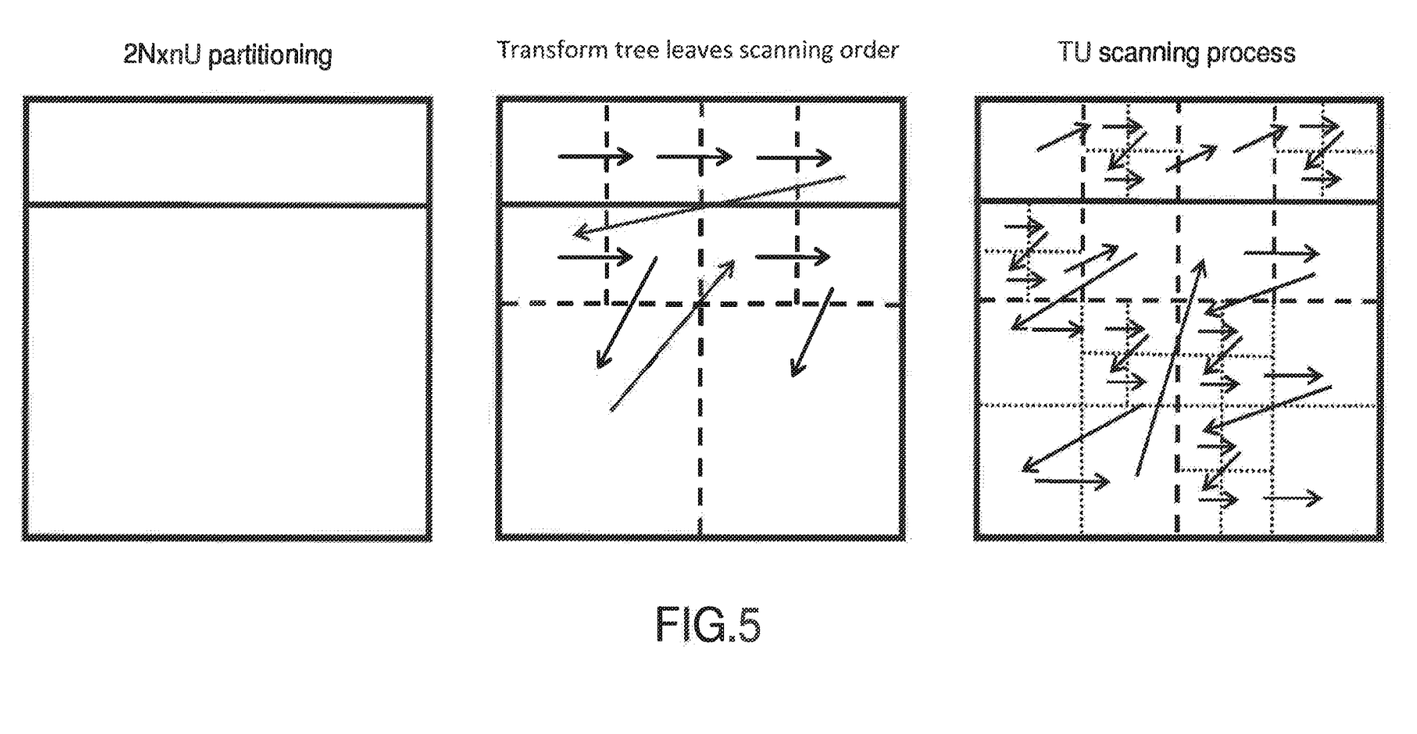

Another example of Transform Tree inferred representation as a function of the Partition Type is illustrated on FIG. 5, for the 2N×nU partition type. As can be seen, according to an embodiment (TT-1) the transform tree leaves are deduced in a way that each transform tree leaf, embedded in a unique Prediction Unit, has a size as large as possible.

According to a given embodiment (TTS-1), the scanning order used to successively process each transform tree leaf inside a Prediction Unit follows a Z-scan order between transform tree leaves (see middle of FIG. 5).

FIG. 5: Left: Asymmetric Partitioning (2N×nU) of a Coding Unit (CU). Middle: Z-scan order used (TTS-1) to decode and encode the transform tree leaves spatially contained in each PU (middle). Right: resulting scanning order used between the TUs contained in the considered CU.

According to another embodiment (TTS-2), the processing of the Transform Tree Leaves contained in a non-square Prediction Unit follows a raster scan order between these transform tree leaves. This is illustrated on the middle of FIG. 6.

Figure 6:
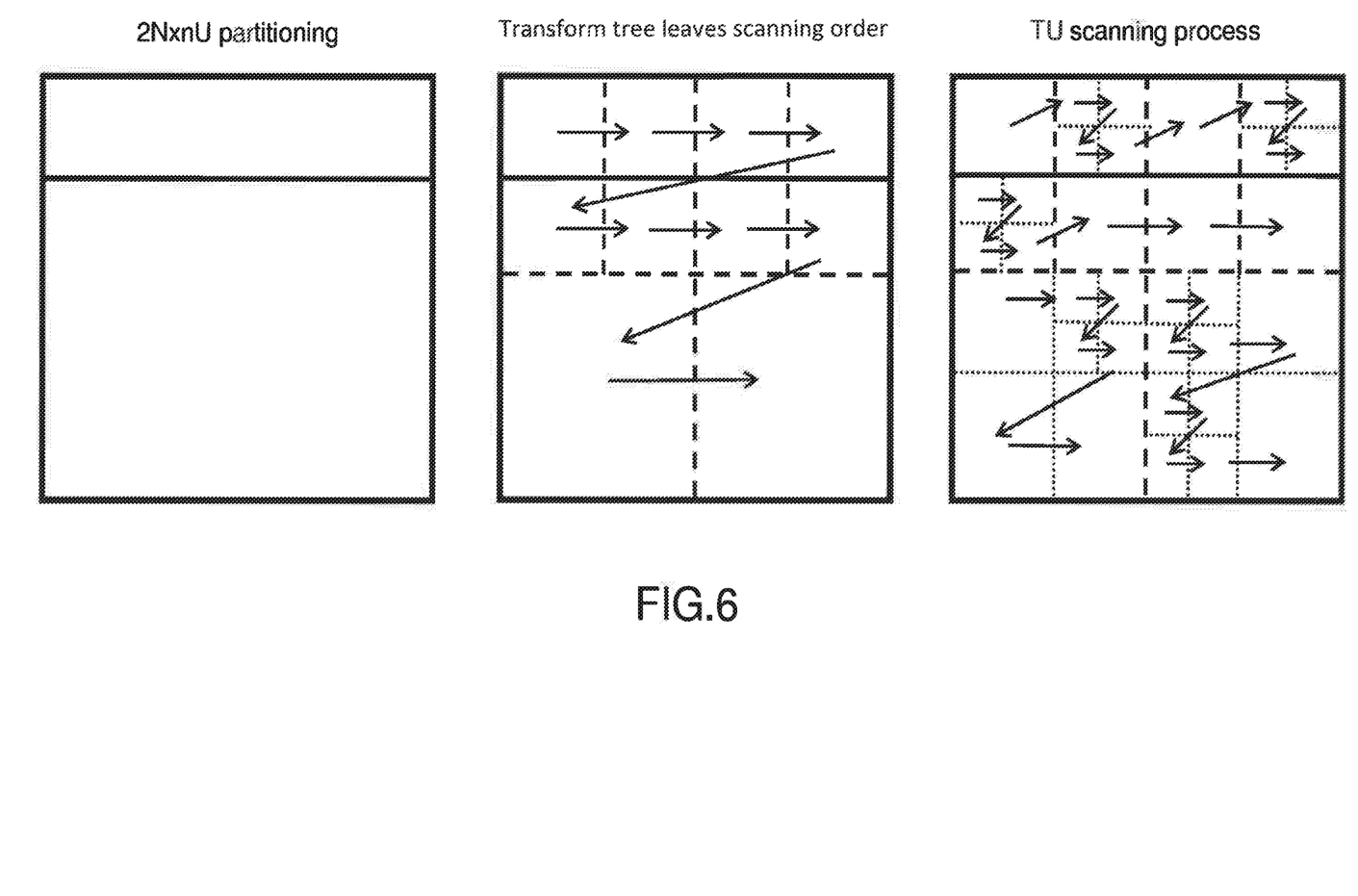

FIG. 6: Left: Asymmetric Partitioning (2N×nU) of a Coding Unit (CU). Middle: Raster-scan order used (TTS-2)

to decode and encode the transform tree leaves spatially contained in each PU (middle). Right: resulting scanning order used between the TUs contained in the considered CU.

According to another embodiment (TT-2), the transform tree leaves divides the Coding Unit such that each Prediction Unit is spatially covered by Transform Tree leaves with equal sizes. This is shown on the middle of FIG. 7 and FIG. 8.

Figure 7:
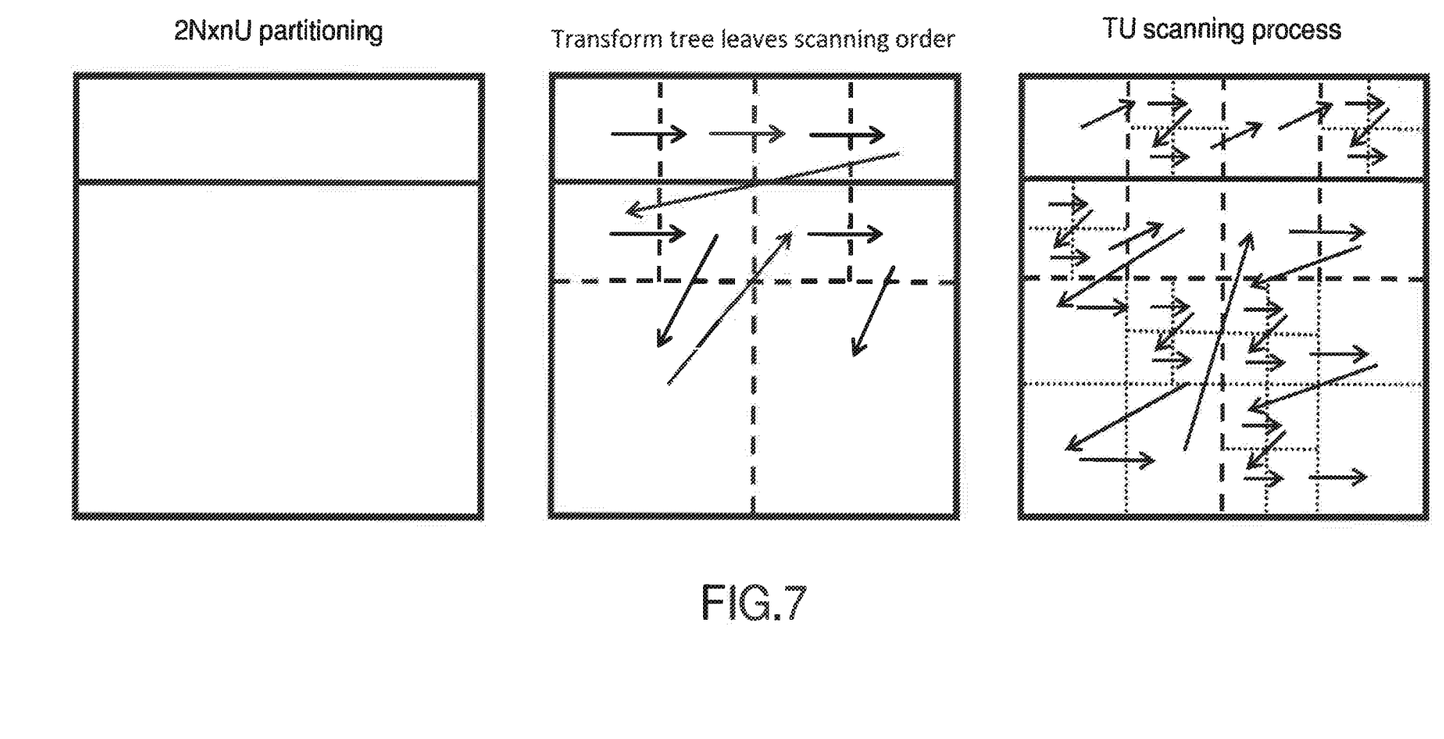

FIG. 7: Asymmetric Partitioning (2N×nU) of a Coding Unit (CU). Middle: Z-scan order used (TTS-1) to decode and encode the transform tree leaves spatially contained in each PU (middle), which have equal sizes (TT-2). Right: resulting scanning order used between the TUs contained in the considered CU.

Figure 8:
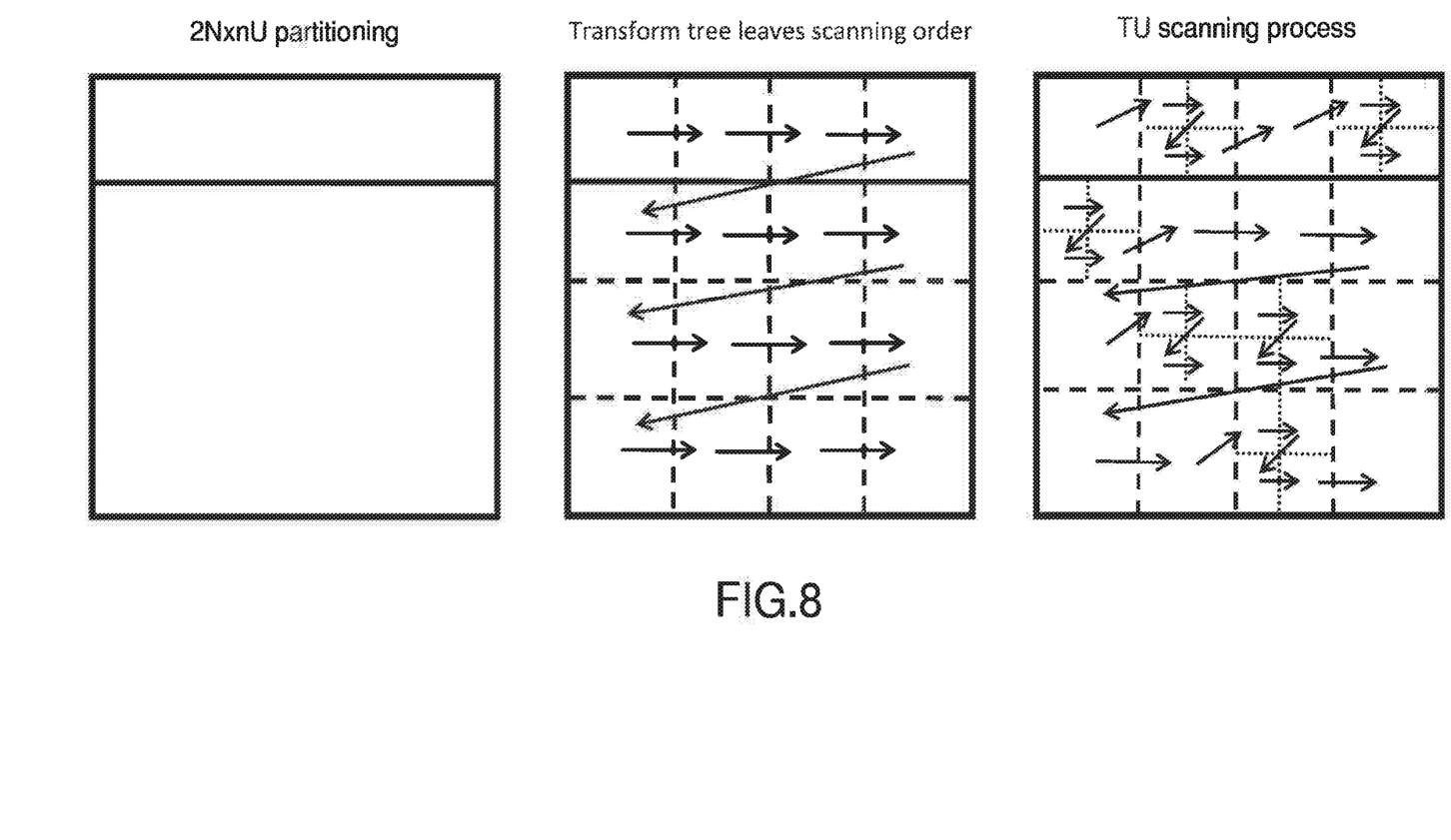

In this last (TT-2) embodiment, the scanning order to encode and decode each transform tree leaf spatially contained in a unique PU may follow a Z-scan order (embodiment TTS-1, middle of FIG. 7, or a raster-scan order (embodiment TTS-2, middle of FIG. 8).

FIG. 8: Left: Asymmetric Partitioning (2N×nU) of a Coding Unit (CU). Middle: Raster-scan order used (TTS-2) to decode and encode the transform tree leaves spatially contained in each PU (middle), which have equal sizes (TT-2). Right: resulting scanning order used between the TUs contained in the considered CU.

Moreover, concerns the inference of the Chroma Components PU type based on the Partitioning chosen for an Intra CU. As illustrated by the bottom left of FIG. 9, the 2N×2N prediction unit type is used to split the Chroma components of the CU, when a non-square partitioning is chosen for splitting the Luma component of the CU.

Moreover, with regards to the Chroma Transform Tree, it can still be fully deduced from the transform tree organization that is decided in the Luma component. This follows the rules already specified in HEVC and in the JEM. This is illustrated on the bottom-right diagram of FIG. 9.

Figure 9:
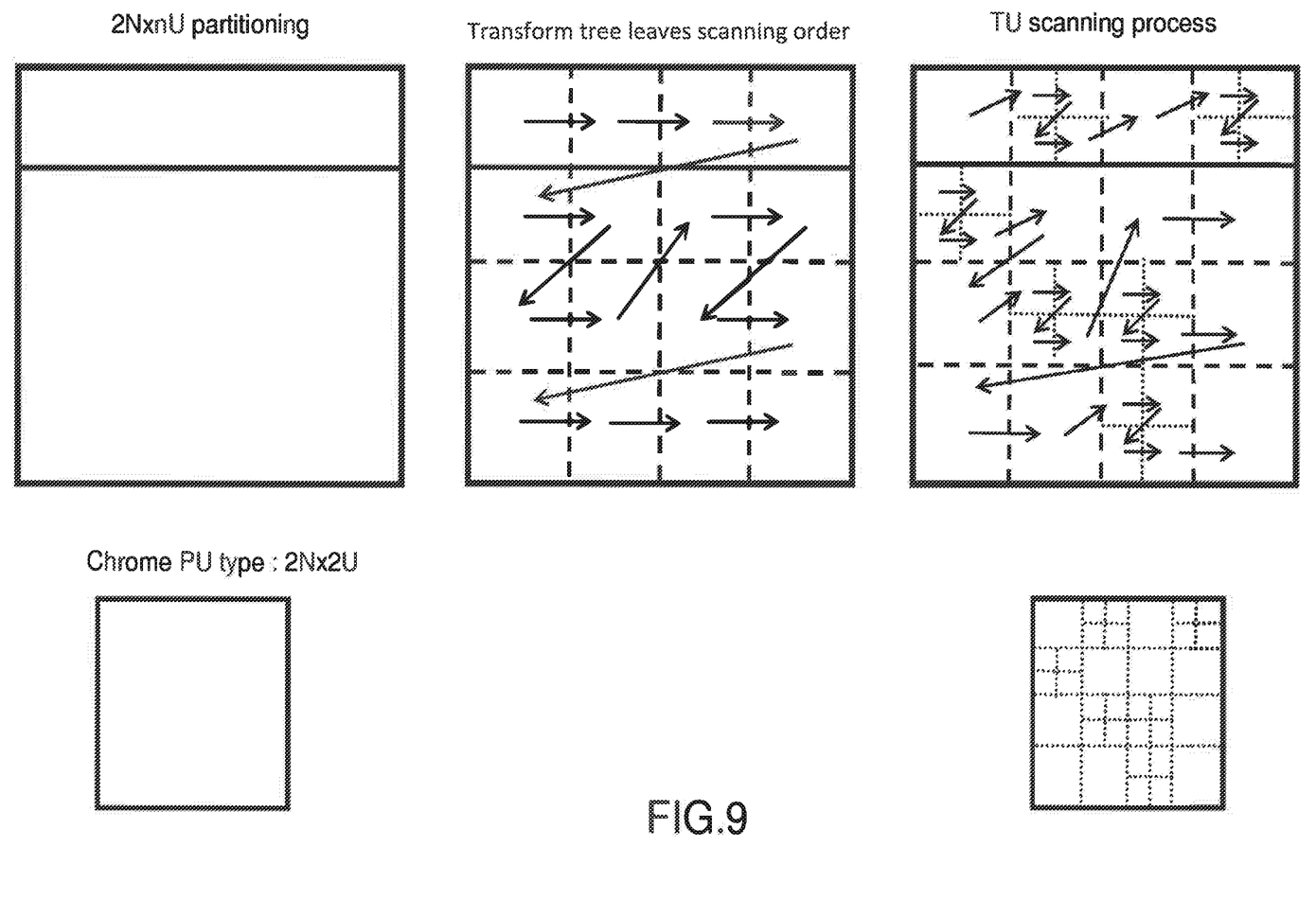

FIG. 9: Top-Left: Asymmetric Partitioning (2N×nU) of a Coding Unit (CU). Top-Middle: Z-scan order used (TTS-1) to decode and encode the transform tree leaves contained in each PU (middle). Top-Right: resulting scanning order used between the TUs contained in the considered CU. Bottom-Left: Chroma PU type in case of a non-square Luma Partitioning. Bottom-Right: Chroma Transform Units deduced from the Luma Transform trees.

The present principles further relates to a method for encoding picture data, said picture data forming at least one coding unit. Then, at least one of said coding units is encoded according to an encoding method as above described in accordance with the pre sent principles.

The present principles further relate to a method for intra-predictive decoding a coding unit comprising picture data, said intra-predictive decoding depending on a prediction tree and a transform tree. The method further comprises:
  obtaining the sizes of the leaves of said transform tree and a non-square partition type;
  building the prediction tree according to said non-square partition type;
  building the transform tree according to the leaves of said transform tree, and in order that each of its leaves is embedded into a unique unit of said built prediction tree.

The present principles further relates to a method for decoding picture data, said picture data forming at least one coding unit. Then, at least one of said coding units is decoded according to an decoding method as above described in accordance with the present principles.

Various embodiments and variants of the decoding method may be easily deduced from the above description, in particular from the description of FIG. 1-9.

On FIG. 1-9, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 10:
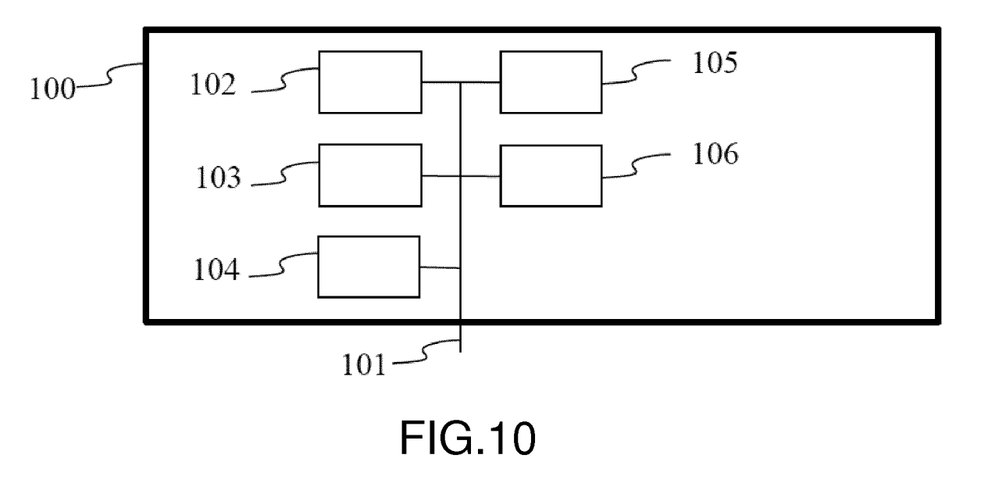
FIG. 10 shows an example of an architecture of a device in accordance with an example of present principles.

FIG. 10 represents an exemplary architecture of a device 100 which may be configured to implement a method described in relation with FIG. 1-9.

Device 100 comprises following elements that are linked together by a data and address bus 101:
  a microprocessor 102 (or CPU), which is, for example, a DSP (or Digital Signal Processor);
  a ROM (or Read Only Memory) 103;
  a RAM (or Random Access Memory) 104;
  an I/O interface 105 for reception of data to transmit, from an application; and
  a battery 106.

In accordance with an example, the battery 106 is external to the device. In each of mentioned memory, the word «register» used in the specification can correspond to area of small capacity (some bits) or to very large area (e.g. a whole program or large amount of received or decoded data). The ROM 103 comprises at least a program and parameters. The ROM 103 may store algorithms and instructions to perform techniques in accordance with present principles. When switched on, the CPU 102 uploads the program in the RAM and executes the corresponding instructions.

RAM 104 comprises, in a register, the program executed by the CPU 102 and uploaded after switch on of the device 100, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the picture data or coding unit to be encoded is obtained from a source. For example, the source belongs to a set comprising:
- a local memory (103 or 104), e.g. a video memory or a RAM (or Random Access Memory), a flash memory, a ROM (or Read Only Memory), a hard disk;
- a storage interface (105), e.g. an interface with a mass storage, a RAM, a flash memory, a ROM, an optical disc or a magnetic support;
- a communication interface (105), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

In accordance with an example of the decoding or a decoder, the decoded picture data or decoded coding unit is sent to a destination; specifically, the destination belongs to a set comprising:
- a local memory (103 or 104), e.g. a video memory or a RAM, a flash memory, a hard disk;
- a storage interface (105), e.g. an interface with a mass storage, a RAM, a flash memory, a ROM, an optical disc or a magnetic support;
- a communication interface (105), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, a signal S is generated.

The signal S has decoding parameters related to a method for intra-predictive decoding a coding unit comprising picture data. Said intra-predictive decoding depends on a prediction tree and a transform tree. The signal S is formatted to comprise information data describing the size of leaves of said transform tree used to build said transform tree, and a non-square partition type used to build said prediction tree.

According to a variant, the information data further being intended to be used to determine a transform tree scanning order, such that the leaves of the transform tree which are embedded in a same unit of said obtained prediction tree are all scanned before starting to scan leaves of the transform tree which are embedded in another unit of said obtained prediction tree.

The signal S is sent to a destination. As an example, The signal S is stored in a local or remote memory, e.g. a video memory (104) or a RAM (104), a hard disk (103). In a variant, one or both bitstreams are sent to a storage interface (105), e.g. an interface with a mass storage, a flash memory, ROM, an optical disc or a magnetic support and/or transmitted over a communication interface (105), e.g. an interface to a point to point link, a communication bus, a point to multipoint link or a broadcast network.

In accordance with examples of decoding or decoder, the signal S is obtained from a source. Exemplarily, the signal S is read from a local memory, e.g. a video memory (104), a RAM (104), a ROM (103), a flash memory (103) or a hard disk (103). In a variant, the signal S is received from a storage interface (105), e.g. an interface with a mass storage, a RAM, a ROM, a flash memory, an optical disc or a magnetic support and/or received from a communication interface (105), e.g. an interface to a point to point link, a bus, a point to multipoint link or a broadcast network.

In accordance with examples, device 100 being configured to implement an encoding method described in relation with FIG. 1-9, belongs to a set comprising:
- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).

In accordance with examples, device 100 being configured to implement a decoding method described above, belongs to a set comprising:
- a mobile device;
- a communication device;
- a game device;
- a set top box;
- a TV set;
- a tablet (or tablet computer);
- a laptop;
- a display and
- a decoding chip.

Figure 11:
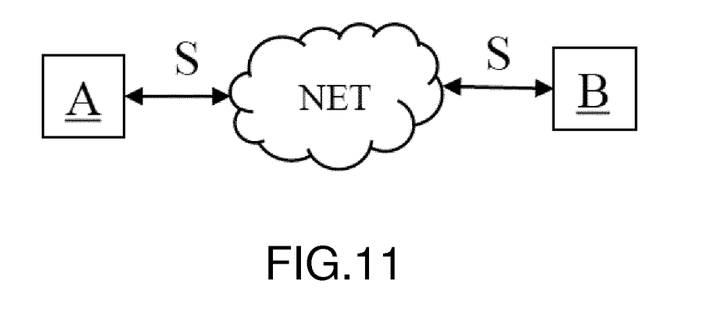
FIG. 11 shows two remote devices communicating over a communication network in accordance with an example of present principles.

According to an example of the present principles, illustrated in FIG. 11, in a transmission context between two remote devices A and B over a communication network NET, the device A comprises a processor in relation with memory RAM and ROM which are configured to implement a method for encoding picture data or coding unit as described above and the device B comprises a processor in relation with memory RAM and ROM which are configured to implement a method for decoding as described above.

In accordance with an example, the network is a broadcast network, adapted to broadcast still pictures or video pictures from device A to decoding devices including the device B.

The signal S is intended to be transmitted by the device A and received by the device B.

Figure 12:
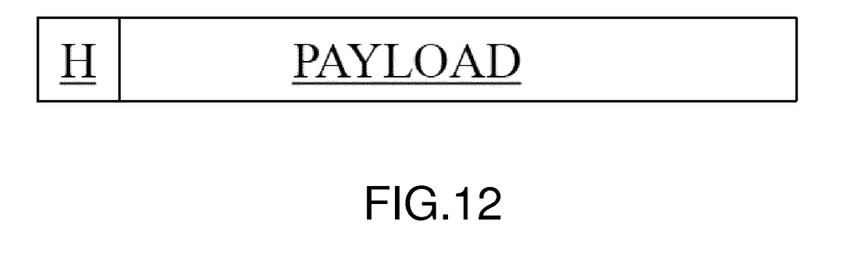
FIG. 12 shows the syntax of a signal in accordance with an example of present principles.

FIG. 12 shows an example of the syntax of such a signal when the data are transmitted over a packet-based transmission protocol. Each transmitted packet P comprises a header H and a payload PAYLOAD. A bit of the header H, for example, is dedicated to represent the information data carried by the signal S. In variant, multiple flags may be used to represent the information data carried by the signal S, each flag being, for example, associated with a node of a the transform and/or prediction tree.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
    obtaining a prediction tree by spatially partitioning a coding unit comprising picture data according to a non-square partition type;
    obtaining a transform tree based at least in part on the coding unit such that each of the leaves of the transform tree is embedded within a co-located unit of the prediction tree; and
    determining a transform tree scanning order according to the non-square partition type of the prediction tree, such that all of a first plurality of leaves of the transform tree which are embedded in a first unit of the prediction tree are scanned before starting to scan a next plurality of leaves of the transform tree which are embedded in a next unit of the prediction tree, such that determining the transform tree scanning order is based on the spatial partitioning of the prediction tree.

2. The method of claim 1, wherein the method further comprises intra-predictive encoding the coding unit depending on the prediction tree, the transform tree and the transform tree scanning order.

3. The method of claim 1, wherein the method further comprises signaling in a signal a size of the leaves of the transform tree and the non-square partition type.

4. The method of claim 1, wherein the non-square partition type is an asymmetric partition type.

5. The method of claim 1, wherein the leaves of a same transform tree have a same size.

6. A device comprising a processor configured to:
    obtain a prediction tree by spatially partitioning a coding unit comprising picture data according to a non-square partition type;
    obtain a transform tree based at least in part on the coding unit such that each of the leaves of the transform tree is embedded within a co-located unit of the prediction tree; and
    determine a transform tree scanning order according to the non-square partition type of the prediction tree, such that all of a first plurality of leaves of a transform tree which are embedded in a first unit of the prediction tree are scanned before starting to scan a next plurality of leaves of the transform tree which are embedded in a next unit of the prediction tree, such that determining the transform tree scanning order is based on the spatial partitioning of the prediction tree.

7. The device of claim 6, wherein the processor is further configured to intra-predictive encode the coding unit depending on the prediction tree, the transform tree and the transform tree scanning order.

8. The device of claim 6, wherein the processor is further configured to signal in a signal a size of the leaves of the transform tree and the non-square partition type.

9. The device of claim 6, wherein the non-square partition type is an asymmetric partition type.

10. The device of claim 6, wherein the leaves of a same transform tree have a same size.

11. A method comprising:
    building a prediction tree from data indicating a non-square partition type from a received signal;
    obtaining sizes of leaves of a transform tree from the received signal;
    building a transform tree according to the sizes of the leaves of the transform tree and according to the non-square partition type of the prediction tree, such that all of a first plurality of leaves of the transform tree which are embedded in a first unit of the prediction tree are scanned before starting to scan a next plurality of leaves of the transform tree which are embedded in a next unit of the prediction tree, such that a transform tree scanning order is based on spatial partitioning of the prediction tree.

12. The method of claim 11, wherein the method further comprises intra-predictive decoding a coding unit comprising picture data, the intra-predictive decoding depending on the prediction tree and the transform tree.

13. The method of claim 11, wherein a transform tree scanning order used to process each transform tree leaf inside each prediction unit is a known order.

14. The method of claim 11, wherein the non-square partition type is an asymmetric partition type.

15. The method of claim 11, wherein the leaves of a same transform tree have a same size.

16. A device comprising a processor configured to:
build a prediction tree from data indicating a non-square partition type from a received signal;
obtain sizes of leaves of a transform tree from the received signal;
build a transform tree according to the sizes of the leaves of the transform tree, and according to the non-square partition type of the prediction tree, such that all of a first plurality of leaves of the transform tree which are embedded in a first unit of the prediction tree are scanned before starting to scan a next plurality of leaves of the transform tree which are embedded in a next unit of the prediction tree, such that a transform tree scanning order is based on spatial partitioning of the prediction tree.

17. The device of claim 16, wherein the processor is further configured to intra-predictive decode a coding unit comprising picture data, the intra-predictive decoding depending on the prediction tree and the transform tree.

18. The device of claim 16, wherein a transform tree scanning order used to process each transform tree leaf inside each prediction unit is a known order.

19. The device of claim 18, wherein the leaves of a same transform tree have a same size.

20. The device of claim 16, wherein the non-square partition type is an asymmetric partition type.

* * * * *